United States Patent
Hagbi et al.

(10) Patent No.: US 12,209,684 B2
(45) Date of Patent: Jan. 28, 2025

(54) HYDRAULICALLY OPERATED VALVE AND SYSTEMS FOR USE THEREWITH

(71) Applicant: AQUESTIA LTD., D.N. Ramat Hagolan (IL)

(72) Inventors: Yeheskiel Hagbi, Nir-Israel (IL); Assaf Heimann, D.N. Lachish Darom (IL); Boris Bernstein, Kibbutz Dorot (IL)

(73) Assignee: AQUESTIA LTD., D.N. Ramat Hagolan (IL)

( * ) Notice: Subject to any disclaimer, the term of this patent is extended or adjusted under 35 U.S.C. 154(b) by 67 days.

(21) Appl. No.: 17/922,666

(22) PCT Filed: May 4, 2021

(86) PCT No.: PCT/IL2021/050510
§ 371 (c)(1),
(2) Date: Nov. 1, 2022

(87) PCT Pub. No.: WO2021/224917
PCT Pub. Date: Nov. 11, 2021

(65) Prior Publication Data
US 2023/0087811 A1     Mar. 23, 2023

Related U.S. Application Data

(60) Provisional application No. 63/019,831, filed on May 4, 2020.

(51) Int. Cl.
*F16K 7/12*     (2006.01)
*F16K 31/126*     (2006.01)
*F16K 37/00*     (2006.01)

(52) U.S. Cl.
CPC .......... *F16K 37/0008* (2013.01); *F16K 7/126* (2013.01); *F16K 31/1266* (2013.01)

(58) Field of Classification Search
CPC . F16K 7/123; F16K 7/126; F16K 7/20; F16K 31/1266; G05D 16/0641
See application file for complete search history.

(56) References Cited

U.S. PATENT DOCUMENTS

| | | | |
|---|---|---|---|
| 1,630,783 | A | 5/1927 | Clark |
| 1,913,027 | A | 6/1933 | Griffith |

(Continued)

FOREIGN PATENT DOCUMENTS

| | | |
|---|---|---|
| BR | 9300961 A | 11/1993 |
| CN | 104455539 A | 3/2015 |

(Continued)

*Primary Examiner* — Hailey K. Do
(74) *Attorney, Agent, or Firm* — Dorsey & Whitney LLP

(57) ABSTRACT

The present application concerns a valve, and particularly position indicating assembly for use therewith. The position indicating assembly comprises a first end engageable with a valve member of the valve, an opposite second end displaceable with respect to a body of the valve in response to displacement of the first end, and an elongate bendable portion, extending between the first end and the second end, configured, upon movement of the valve member, to transmit forces operating along the elongate bendable portion, at least from said first end to said second end, so as to displace said second end, the elongate bendable portion being further configured for damping forces operating transversely thereto by reversibly bending.

5 Claims, 6 Drawing Sheets

(56) References Cited

U.S. PATENT DOCUMENTS

| | | | |
|---|---|---|---|
| 3,011,758 A * | 12/1961 | McFarland, Jr. | F16K 7/126 92/99 |
| 3,055,629 A | 9/1962 | Jurs et al. | |
| 3,148,254 A | 9/1964 | Clason | |
| 3,412,974 A | 11/1968 | John | |
| 3,448,442 A | 6/1969 | Hube | |
| 3,501,605 A | 3/1970 | Hutchinson et al. | |
| 3,729,604 A | 4/1973 | Groff et al. | |
| 3,802,462 A | 4/1974 | Trosch | |
| 3,845,259 A | 10/1974 | Spurr | |
| 4,068,712 A | 1/1978 | Stump | |
| 4,072,292 A | 2/1978 | Banon | |
| 4,074,097 A | 2/1978 | Hutchinson et al. | |
| 4,140,045 A | 2/1979 | Hardwick et al. | |
| 4,316,482 A | 2/1982 | Pearce et al. | |
| 4,319,737 A | 3/1982 | Waterfield | |
| 4,614,122 A | 9/1986 | Graves | |
| 4,785,844 A | 11/1988 | Pankov | |
| 4,945,344 A | 7/1990 | Farrell et al. | |
| 5,383,646 A | 1/1995 | Weingarten | |
| 5,520,209 A | 5/1996 | Goins et al. | |
| 5,645,264 A | 7/1997 | Kah | |
| 5,706,859 A | 1/1998 | Baecklund | |
| 6,095,484 A * | 8/2000 | Frenkel | F16K 7/126 137/488 |
| 6,216,731 B1 | 4/2001 | Frenkel | |
| 6,283,950 B1 | 9/2001 | Appling | |
| 6,752,376 B1 | 6/2004 | Satou et al. | |
| 7,134,448 B2 | 11/2006 | Palle | |
| 7,980,531 B2 | 7/2011 | Myhrberg et al. | |
| 8,051,915 B2 | 11/2011 | Blease et al. | |
| 8,596,295 B2 | 12/2013 | Colpan et al. | |
| 8,616,234 B2 | 12/2013 | Ringer et al. | |
| 8,794,595 B2 | 8/2014 | Reed et al. | |
| 8,851,195 B2 | 10/2014 | Deurloo | |
| 9,046,180 B2 | 6/2015 | Matalon | |
| 9,500,283 B1 | 11/2016 | Price et al. | |
| 9,574,673 B2 * | 2/2017 | Ringer | F16K 37/0025 |
| 9,803,755 B2 | 10/2017 | Weingarten | |
| 9,933,076 B2 | 4/2018 | Ringer et al. | |
| 10,082,212 B2 | 9/2018 | Ringer et al. | |
| 11,794,047 B2 * | 10/2023 | Workman | F16K 31/12 |
| 2003/0098073 A1 | 5/2003 | Jannotta | |
| 2005/0155777 A1 | 7/2005 | Reilly et al. | |
| 2005/0205815 A1 | 9/2005 | Frenkel | |
| 2010/0071776 A1 | 3/2010 | Ringer et al. | |
| 2011/0203685 A1 | 8/2011 | Lin et al. | |
| 2011/0297255 A1 | 12/2011 | Weingarten | |
| 2014/0061525 A1 | 3/2014 | Matalon | |
| 2019/0257438 A1 | 8/2019 | Naor et al. | |
| 2020/0011436 A1 | 1/2020 | Williams | |
| 2021/0341066 A1 | 11/2021 | Ringer et al. | |

FOREIGN PATENT DOCUMENTS

| | | |
|---|---|---|
| CN | 206001042 U | 3/2017 |
| CN | 106885011 A | 6/2017 |
| DE | 102017102425 A1 | 8/2018 |
| EP | 0452374 A1 | 10/1991 |
| EP | 0571850 A1 | 12/1993 |
| EP | 1406023 A2 | 4/2004 |
| EP | 2861901 A1 | 4/2015 |
| FR | 2442388 A1 | 6/1980 |
| GB | 801448 A | 9/1958 |
| GB | 808074 A | 1/1959 |
| GB | 868278 A | 5/1961 |
| GB | 917719 A | 2/1963 |
| GB | 926129 A | 5/1963 |
| GB | 992576 A | 5/1965 |
| KR | 20090010276 U | 10/2009 |
| KR | 101285294 B1 | 7/2013 |
| WO | 9837344 A1 | 8/1998 |

* cited by examiner

HYDRAULICALLY OPERATED VALVE AND SYSTEMS FOR USE THEREWITH

TECHNOLOGICAL FIELD

The present invention concerns valves, diaphragms for use therewith, and indicator mechanisms configured to indicate the condition of the valve.

BACKGROUND

Valves incorporating indication mechanisms for indicating the position of a valve member thereof, e.g., a movable diaphragm, are well known in the field. Such valves typically include a rigid member, sometimes in the form of a rod, connected at one end to the valve member, and having an opposite end protruding out of the valve. The rigid member is configured to move together with the valve member, usually up and down, and thereby indicate the position of the valve member for an external viewer looking at the valve. In that case, the position of the valve member corresponds to the extent of protrusion of the rigid member from the valve. Those rigid members tend to break and permanently bend due to forces applied thereon by the diaphragm and the flow within the valve. As a result, they sometimes render the indication mechanism, and even the entire valve, non-functional.

Hydraulically actuated weir type valves typically lack support means for centralizing their diaphragms as the latter moves between position therein. Thus, diaphragms being used in such valves are very subject to drifting downstream, tilting, and even deforming while in use. When such diaphragms are stated in a position configured to seal their respective valve, i.e., a position at which they abut the weir of the valve, such drifting, tilting and deformation may cause a leakage in the valve, and/or unwanted pressure increase downstream caused to due volume of the diaphragm being drifted downstream. Valves which are configured to facilitate passage of water therethrough are even more subject to rising pressure upstream, as water are incompressible.

GENERAL DESCRIPTION

According to a first aspect of the presently disclosed subject matter there is provided a position indicating assembly for use with a valve having a valve body and an inner valve member configured to control fluid flow through the valve by being moveable between a first position corresponding to a first intensity of flow through the valve, and a second position corresponding to a second intensity of flow through the valve, said second intensity being greater than said first intensity, said position indicating assembly comprising an indicator having:

a first end engageable with said valve member so as to displace upon movements thereof;

an opposite second end displaceable with respect to the valve body in response to displacement of said first end, so as to indicate position of the valve member between the first position and the second position; and an elongate bendable portion, extending between said first end and said second end, configured, upon movement of said valve member, to transmit forces operating along the elongate bendable portion, at least from said first end to said second end, so as to displace the second end, and absorb forces operating transversely to the elongate bendable portion, by reversibly bending.

According to a second aspect of the presently disclosed subject matter, there is provided a valve configured to control fluid flow therethrough, said valve having a valve body and an inner valve member configured to control fluid flow through the valve by being moveable between a first position corresponding to a first intensity of flow through the valve, and a second position corresponding to a second intensity of flow through the valve, said second intensity being greater than said first intensity, said valve including a position indicating assembly comprising an indicator having:

a first end engaged with said valve member so as to displace upon movements thereof;

an opposite second end displaceable with respect to the valve body in response to displacement of said first end, so as to indicate position of the valve member between the first position and the second position; and an elongate bendable portion, extending between said first end and said second end, configured, upon movement of said valve member, to transmit forces operating along the elongate bendable portion so as to displace the second end, and absorb forces operating transversely to the elongate bendable portion, by reversibly bending.

The elongate bendable portion can be configured to transmit forces which their operation vector substantially aligns with the longitudinal axis of the elongate bendable portion. The reversible bending minimizes the resistant of the elongate portion to moments created by the forces being transmitted, and effectively damps non-desired forces, i.e., forces which their operation vector is transverse to the longitudinal axis of the elongate bendable portion, such as forces created from undesired deformation of the valve member, optionally towards the downstream direction of the valve.

The reversible bending of the elongate bendable portion refers herein, in general, to elastic deformation thereof, i.e., after which the deformed body tends to go back to its original position before bending. It should be appreciated that in some cases the elongate bendable portion can be permanently bend, i.e., perform plastic deformation, however, the dimensions of the bendable elongate portion, and the boundaries with at which it is configured to operate in the valve, should be sufficient for maintaining the elongate bendable portion in its elastic region for any typical operational load of the valve.

Using such bendable elongate portion for transferring forces renders the position indication assembly more reliable, as the resiliency of the elongate bendable portion allows the elongate bendable portion to moderately absorb undesired forces without permanently bending. Further, allowed deformation of the elongate bendable portion facilitates using non-robust design therefore in comparison to a design of which not allowing any deformation i.e., a rigid design, configured to completely resist to all undesired forces.

Even if the elongate bendable portion does reach its plastic region and is permanently deformed, it will be deformed sideways such that from that point onwards, compression forces applied by the valve member on the elongate bendable portion during normal operation thereof, will induce moment forces in the area of maximal deformation. Those moment forces can be potentially greater in impact than the normal desired/undesired forces induced by the valve member, and can therefore induce further bending in the plastic region of the elongate bendable portion. In that case, the elongate bendable portion will continue deforming as the valve member continues its operation.

Any one or more of the following features, designs and configurations can be applied to a position indicating assembly and a valve according to the present disclosure, separately or in various combinations thereof:

The valve can be hydraulically operated, optionally by a pilot arrangement.

The valve member can be a diaphragm disposed within the valve, configured to displace between the first and second positions to alter the intensity of fluid flow through the valve.

One of said first and second intensities of flow can be associated with a fully open state of the valve, while the other can be associated with a fully closed state of the valve.

The elongate bendable portion can have mechanical properties which, on the one hand facilitates large elastic region, so that the elongate bendable portion will be able to withstand some bending, and on the other hand large plastic region, so that the elongate bendable portion will be able to continue bending without breaking.

The elongate bendable portion can be made of malleable material, e.g., metal such as aluminum, aluminum alloy, or stainless steel.

The term malleable as used herein refers to a material being capable of bending without breaking to a great extent.

The elongate bendable portion can be low-weight and thin, such that even when it brakes, it will not disrupt the normal operation of the valve, as the broken pieces will be able to be pressed onto the ceiling of the valve by the valve member, without damaging the valve member.

According to an example of the presently disclosed subject matter, the elongate bendable portion is in the form of a wire or a wire-like element such as a strip.

The elongate bendable portion can be configured to transmit pulling forces between said second end and said first end.

The forces being transmitted by said elongate bendable portion can be at least pushing forces operating at least in a direction from said first end to said second end.

The bendable portion can have a main axis extending therealong; and have a first degree of force transmissibility along said main axis, and a second degree of force transmissibility perpendicularly to said main axis, at least from said second end to said first end, said second degree being smaller than said first degree.

The bendable portion can have a third degree of force transmissibility along said main axis in a direction from said first end to said second end, said third degree being greater than said second degree.

The bendable portion can be configured to transmit tension forces from said first end to said second end.

The bendable portion can be configured to transmit compression forces from said first end to said second end.

The bendable portion can be flexible.

The elongate bendable portion can be configured to transfer at least tension forces therealong, and optionally compression forces, e.g., when the elongate bendable portion is in the form of an element capable of both, i.e., a push-pull cable or a rigid/semi rigid strip e.g., of a metal sheet.

The position indicating assembly can further comprise a position indicating mechanism accommodating said second end, configured to be actuated upon displacement of said second end and indicate the position of said valve member.

The position indicating mechanism can be configured to be pulled and/or pushed by said second end during displacement thereof, to change an observable parameter of the position indicating mechanism indicative of the position of the valve member.

When the second end is configured to merely pull or push the position indicating mechanism, the latter can further include a biasing mechanism configured to hold the second end close together with the valve member.

The position indicating mechanism can comprise a linearly moveable member connected to said second end configured to be displaced with respect to said valve body in response to displacement of said second end and thereby actuate the position indicating mechanism.

According to an example of the presently disclosed subject matter, the linearly movable member elongate bendable portion is in the form of a rigid element protruding from an exterior of the valve body, configured to change its extent of protrusion from the valve body due to pushing and/or pulling thereof by the second end.

The position indicating mechanism comprises an indicator housing configured to accommodate said at least a portion of said movable member in an interior thereof, said interior having an indicator axis along which said movable member is configured to be displaced.

The indicator axis can be configured to be vertically oriented.

It should be appreciated that an imaginary line can extend between said first end and said second end, and wherein said first end is displaceable with said valve member between an aligned position at which said imaginary line is aligned with said indicator axis, typically corresponding to a straight orientation of said bendable portion, and an angled position at which said imaginary line forms an angle with said indicator axis, typically corresponding to a bended state of said bendable portion.

The parallel position can correspond to at least said first position of the valve.

The position indicating assembly according to any one of the preceding claims, further comprising an engagement member configured to facilitate engagement between said first end and said valve member, said engagement member can have a first face configured to engage said valve member, and an opposite, second face from which said first end is configured to protrude.

The first end can be configured to be connected to said engagement member in a manner allowing angular displacement of said first end with respect to said engagement member.

Such arrangement adds a degree of freedom, i.e., angular displacement, to the elongate bendable portion, thereby increasing its resistance to bending.

The engagement member can comprise a socket and said first end can comprise a wide/bended portion configured to be fitted to said socket to achieve a ball-and-socket arrangement therewith.

The lower face of said engagement member can have a shape corresponding to that of the valve member.

The position indicating assembly can further comprise a biasing arrangement configured to bias said first end away or towards said valve member.

According to a particular example, the biasing arrangement is configured to bias said first end towards said valve member.

The biasing arrangement can comprise a spring configured to be positioned between said engagement member and said second end.

The valve member can be a diaphragm, particularly an hydraulically operated diaphragm configured to move between said positions by virtue of pressure applied by liquid flowing through the valve.

The first intensity can be equal to 0.

The second intensity can be the maximal intensity of flow obtainable through the valve.

The elongate bendable portion can extend between an upper face of said valve member, and a ceiling face of said valve body, said upper face and said ceiling face can be parallel at least when said valve member is at its second position.

The bendable portion can be configured to allow said upper face to obtain an angle with respect to said ceiling face.

The valve can comprise an hydraulic pilot arrangement configured to control movements of said valve member between said positions.

The valve can be a direct-sealing valve.

According to another aspect of the presently disclosed subject matter, there is provided a weir type hydraulic pressure actuated valve comprising:
- an inlet having an aperture defining an inlet central streamline axis extending therealong;
- an outlet having an aperture defining an outlet central streamline axis extending therealong, said outlet defining together with said inlet a main flow path for liquid to flow in through the valve;
- a weir disposed between the inlet and outlet such that said central streamlines are met thereabove; and
- a diaphragm disposed above said weir, said diaphragm comprising:
    - a circumferential portion fixedly held by said valve body; and
    - a reinforced central portion movable with respect to said circumferential portion, by hydraulic pressure applied by said liquid, between a lower position at which said central portion is compressed against said weir, thereby sealing said flow path, and an upper position at which said central portion is spaced from said weir, thereby enabling said flow path, said central portion having a top face configured to face away from said weir, and an opposite bottom face divided into an upstream face configured to face said inlet and a downstream face configured to face said outlet;
    - said central portion having a lower region with a convex face constituting a lowermost portion of said bottom face, said lower region having a first bendability allowing said lower region to maintain its shape at least during movement of the central portion at least in between said lower and upper positions, and an upper region with a circular face constituting an uppermost portion of said bottom face, said upper region having a second bendability greater than said first bendability allowing said upper region to facilitate said movement.

According to yet another aspect of the presently disclosed subject matter, there is provided a diaphragm configured to be actuated by hydraulic pressure, for use with a weir type valve having a valve body including an inlet extending into an upstream chamber, an outlet extending from a downstream chamber defining together with the inlet a main flow path for fluid to flow in through the valve, and a weir disposed between said chambers, said diaphragm comprising:
- a circumferential portion configured to be fixedly held by said valve body;
- a reinforced central portion having a top face configured to face away from said weir, and an opposite bottom face divided into an upstream face configured to face said upstream chamber, and a downstream face configured to face said downstream chamber, said central portion being movable with respect to said circumferential portion, by hydraulic pressure applied by said liquid, between a lower position at which said central portion is configured to be compressed against said weir, thereby sealing said flow path, to an upper position at which said central portion is configured to be spaced from said weir, thereby enabling said flow path;
- said central portion having a lower region with a first bendability, allowing said upper region to maintain its shape at least during movement of the central portion at least in between said lower and upper positions, and an upper region with a second bendability greater than said first bendability allowing said upper region to facilitate said movement; said lower region having a convex face, constituting a lowermost portion of said bottom face, and said upper region having a circular face constituting an uppermost portion of said bottom face; wherein said central portion has a longitudinal axis extending tangent to an apex of the convex face, in a direction from the upstream face to the downstream face; and wherein at a cross section of the diaphragm taken along said longitudinal axis, a contour of said convex face is greater than a contour of said circular face.

The term bendability as used herein the specification and claims, refers to the ability of an item, or a portion, i.e., region, of an item, to be easily bent without breaking. As such higher bendability of an item/region refers to a greater ability of an item to be easily bent, i.e., be more bendable.

Any one or more of the following features, designs and configurations can be applied to a valve, a diaphragm, and a method for manufacturing a diaphragm according to the present disclosure, separately or in various combinations thereof:

The inlet can have an aperture defining an inlet central streamline axis extending along said inlet chamber, and said outlet can have an aperture defining an outlet central streamline axis extending along said outlet chamber, and wherein said streamline axes are met, and optionally coincide, above said weir.

The lower portion can be configured to maintain its shape at a lower position while experiencing a typical pressure gradient between the upstream face and the downstream face.

The lower region can have an average thickness, between the top and bottom faces, of at least two times that thickness of said bendable region.

The diaphragm can have a longitudinal axis extending tangent to an apex of said lower convex face, in a direction from said upstream face to said downstream face; and wherein at a half way point along said longitudinal axis, between said apex and a projection of said border on said longitudinal axis, said diaphragm has a thickness between said top and bottom faces of at least two times that thickness at said border, at least for a portion of the diaphragm associated with said upstream face.

The bendable region can have a thickness, between the top and bottom faces of the diaphragm, smaller than that thickness of the lower region, throughout said longitudinal axis.

The diaphragm can comprises an array of support ribs protruding from the top face thereof, configured to bias said central portion towards its lower position.

The support ribs can be related to said bendable region.

The central portion can comprises an upstream portion associated with said upstream face, and having a first volume, and an opposite downstream portion associated with said downstream face, having a second volume greater than said first volume.

The diaphragm can further comprise at least one reinforcing bulge protruding from said top face, above said downstream face. #

The at least one reinforcing bulge can protrude from said bendable region.

The at least one reinforcing bulge can be two or more reinforcing bulges, symmetrically disposed with respect to said longitudinal axis.

The diaphragm can comprise a support portion configured to engage a support element of the valve extending from said weir across said outlet chamber, and wherein said support portion has a lower thickness than adjacent portions thereto.

The at least two bulges can symmetrically extend from either side of said support portion.

The at least two bulges can have a gradually increasing volume towards said support portion.

The convex face can have a surface area of at least 50% of said bottom face, more particularly of at least 65%, and yet more particularly, of at least 80%.

The diaphragm can further comprise at least one sealing rib protruding from said bottom face, configured to engage said weir at said lower position of said diaphragm, said sealing rib extending across said convex face and into at least a portion of said circular face, separating said upstream face from said downstream face.

A majority of the bendable region can have the same thickness between the top and bottom faces, while that thickness of said lower region varies.

The diaphragm can be made of layers of elastic sheet material.

The diaphragm can further comprise at least one layer of fabricated material disposed thereacross, wherein a thickness of the diaphragm between the layer of fabricated material and said top bottom face, is greater than a thickness of the diaphragm between the layer of fabricated material and said bottom face.

The layer of fabricated material can be sandwiched between two smooth faces of layers of elastic material, a bottom layer thereof having a gradually increasing thickness from its respective face sandwiching said layer of fabricated material, to said bottom face.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, at which.

DETAILED DESCRIPTION OF EMBODIMENTS

Figure 1A:
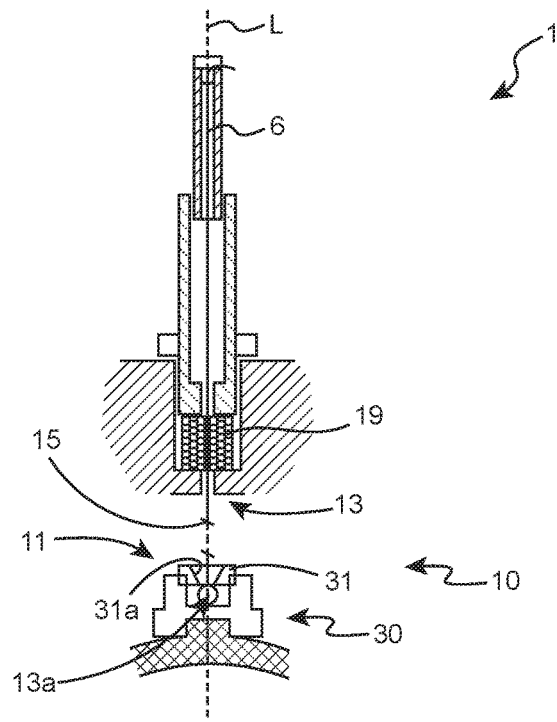
FIG. 1A illustrates a front sectional view of a position indication assembly according to one example of the presently disclosed subject matter.
Figure 1B:
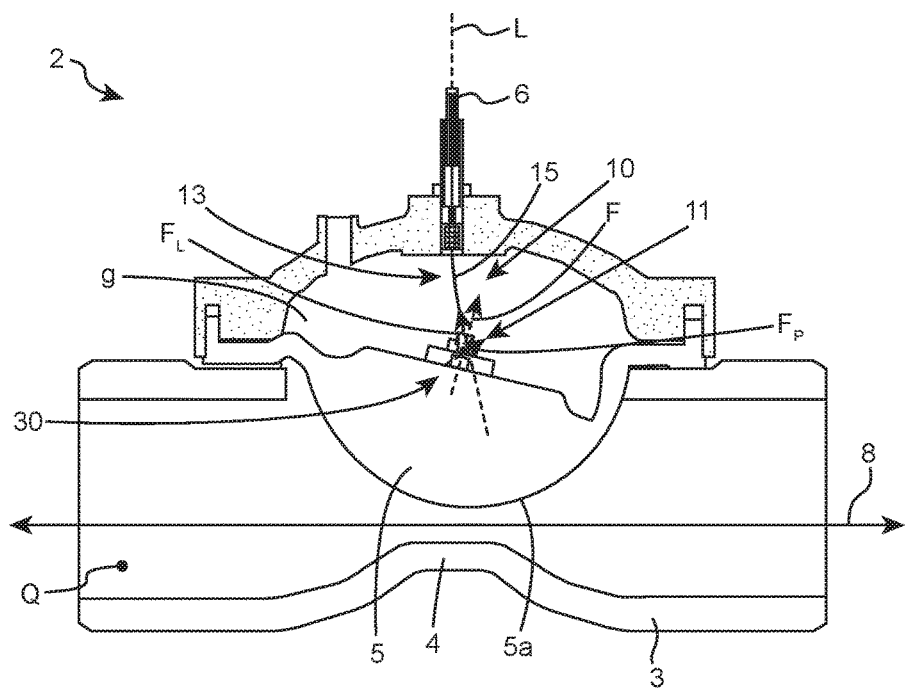
FIG. 1B is a front sectional view of a valve installed with the position indication assembly of FIG. 1A.

Attention is first directed to FIGS. 1A and 1B of the present disclosure illustrating a position indicating assembly 1, and a valve 2 configured to moderate flow along a pipeline (not illustrated), incorporating the position indicating assembly 1.

The valve 2 is a weir type diaphragm valve, configured to be actuated by hydraulic pressure of liquid Q flowing therethrough. In particular, the valve 2 comprises a valve body 3 defining a main flow path 8 and a control chamber 9 separated from the main flow path 8 by an inner movable valve member in the form of diaphragm 5. The valve body 3 further comprises a weir 4 protruding into the main flow path 8, substantially symmetrically beneath the diaphragm 5.

The moderation of flow by the valve 2 is performed by up and down movements of the diaphragm 5. In particular, the diaphragm 5 is configured to move between a flow blocking state at which it engages the weir 4, rendering the flow intensity through the main flow path 8 minimal, and particularly 0, and a flow enabling state, at which the diaphragm is at a maximal distance from the weir 4, rendering the flow intensity through the main flow path 8 maximal. In FIG. 1B, the diaphragm 5 is seen in an intermediate state between the flow blocking state and the flow enabling state.

It should be appreciated that other valves according to the presently disclosed subject matter may not include a flow blocking state of their diaphragms. Instead, their diaphragms may be configured to move between two flow enabling states, where at one of which the flow intensity through the valve is greater than the other.

In any case, it should be appreciated that the flow intensity through the valve 1 is directly linked to the current position of the diaphragm 5, i.e., to the height thereof above the weir 4, and it is thus a purpose of the position indicating assembly 1 to indicate that position.

The position indicating assembly 1 is configured to provide live indication of the current position of the diaphragm 5 with respect to the weir 4, and as a derivative, of the current intensity of flow through the valve 2.

The position indicating assembly 1 can be formed integrally with the valve 2 or be retrofitted thereto, and although seen in use herein for indicating the position of the diaphragm 5, it should be appreciated that the position indicating assembly 1 can be used in any valve having a movable valve member, to indicate the current position thereof.

The position indicating assembly 1 comprises an inner indicator 10 concealed within the control chamber 9, connected to an external indicating mechanism, here in the form of a linearly movable indicator rod 6 protruding exteriorly from a top of the valve body 3 to a vary extent, which is indicative of the height of the diaphragm 5, as will be explained hereinafter.

The indicator 10 is configured to push and pull the indicator rod 6, in response to movements of the diaphragm 5, and thereby change the extent of protrusion of the rod 6 from the valve body 3.

The indicator 10 comprises a first end 11 in engagement with the diaphragm 5 such that it displaces upon movements thereof, and an opposite second end 13 directly connected to the indicator rod 6, configured to displace in response to displacement of the first end 11, and thereby move the rod 6.

In between, the indicator 10 comprises an elongate bendable portion, in the form of a wire 15, configured to transmit pushing and pulling forces operating therealong, from the first end 11 to the second end 13, so as to displace the second end 13, along with the indicator rod 6, in response to movements of the first end 11 along with the diaphragm 5.

As such, when the diaphragm 5 rises above the weir 4, it applies pushing forces on the first end 11. Those pushing forces are transmitted through the wire 15 to the second end 13, which, in response, displaces together with the indicator rod 6 in an upward direction, thereby changing the extent of protrusion of the indicator rod 6 from the valve body 3. As such, at the flow blocking state, i.e., lower position, of the diaphragm 5, the indicator rod 6 protrudes above the valve body 3 to a minimal extent, and at the flow enabling state, i.e., high position, of the diaphragm 5, the indicator rod 6 protrudes above the valve body 3 to a maximal extent.

As the valve 2 is a pressure actuated valve, the diaphragm 5 thereof is not held fixed in its position and orientation by any rigid fixing element, and has no driving means such as a stem configured to facilitate the up and down movement thereof. Instead, the diaphragm 5 is configured to move by means of pressure gradients and currents within the valve 2. Desirably, the diaphragm 5 should be configured to move merely up and down as a result of pressure gradients between the control chamber 9 and the main flow path 8, however, in reality, the diaphragm 5 is also subject to perform other, undesired movements such as tilting, deforming, and drifting sideways.

Such undesired movements may be induced by pressure gradients and flow currents within the valve 2, and are most likely to occur when the diaphragm 5 is at an intermediate position, as shown in FIG. 1B, at which it is unsupported by the weir 4 or by a ceiling 9a of the control chamber 9, and a pressure gradient exists along a lower face 5a thereof.

Such undesired deformations of the diaphragm 4 may lead to development of undesired shear and bending stresses in the wire 15. In order to withstand such shear and bending stresses without failing, the wire 15 is made of a resilient material making it reversibly bendable so it will be able to absorb forces operating transversely thereto, i.e., shear and bending forces, yet be rigid enough to transmit forces therealong, i.e., compression and tension forces.

In particular, the wire 15 has a longitudinal axis L, which is curved when the wire 15 is, as seen in FIG. 1B. The wire 15 is configured to transmit from the first end 11 to the second end 13 mainly components of forces having their operational vector substantially aligned with the longitudinal axis L, such as component FL of the force F, seen in FIG. 1B, and damp components of forces having their operational vector perpendicular to the longitudinal axis L, such as component FP of the force F, i.e., is configured to damp components of forces which may induce moment forces along the wire 15.

As such, it can be appreciated that the wire 15 has a first degree of force transmissibility along the axis L, and a second degree of force transmissibility perpendicularly to the axis L being smaller than said first degree.

The reversible bending of the wire 15 refers herein, in general, to elastic deformation thereof, i.e., after which the deformed wire 15 tends to go back to its original position before bending.

It should be appreciated that in some cases the wire 15 can be permanently bent due to appliance of those undesired forces, i.e., perform plastic deformation, however, the dimensions of the wire 15, i.e., its small length and thin thickness, and the boundaries with at which the wire 15 is configured to operate in the valve 2, should be sufficient for maintaining the wire 15 in its elastic region for any typical operational load of the valve 1.

The boundaries with at which the wire 15 is configured to operate can be determined by the degrees of freedom the two ends 11 and 13 have within the valve body 3. Herein, the second end 13 is fixedly connected to the linearly movable indication rod 6, such that it is only capable of moving linearly up and down therewith, and the first end 11 is engaged with a central portion of the diaphragm 5, such that it is less subject to deformation of the diaphragm 5, rather to tilting and drifting thereof.

To reduce the impacts of such tilting and drifting, the second end 13 herein engages the diaphragm 5 via an engaging member of the assembly 1, in the form of a support plate 14.

The support plate 14 is seen herein fixedly connected to the central portion of the diaphragm 5, and comprises a socket 31 with at which a bended or thickened portion 13a of the second end 13 is configured to be placed, thereby forming a ball-and-socket coupling therewith facilitating tilting without bending of the second end 13.

The ball-and-socket coupling allows the second end 13 to form an angle with the support plate 14, and thus with the diaphragm 5, within the boundaries of a cone-like bounding face 31a of the socket 31, where the gradient of the cone defines the maximal angle the second end 13 is configured to acquire with respect to the diaphragm 5. Further, the minimal aperture of the cone, i.e., lower aperture thereof, defines drifting boundaries with at which the second end 13 can displace without bending when the diaphragm 5 drifts.

Using such reversibly bendable wire 15 for transmitting longitudinal forces from the diaphragm 5 renders the position indication assembly 1 more reliable, as it is less likely to fail, and more likely to provide true indication on the height of the diaphragm 5 above the weir 4. Further, allowed deformation of the wire 15 enables applying a non-robust design therefore, when compared with a robust rigid design configured to completely resist to all undesired forces.

Figure 2A:
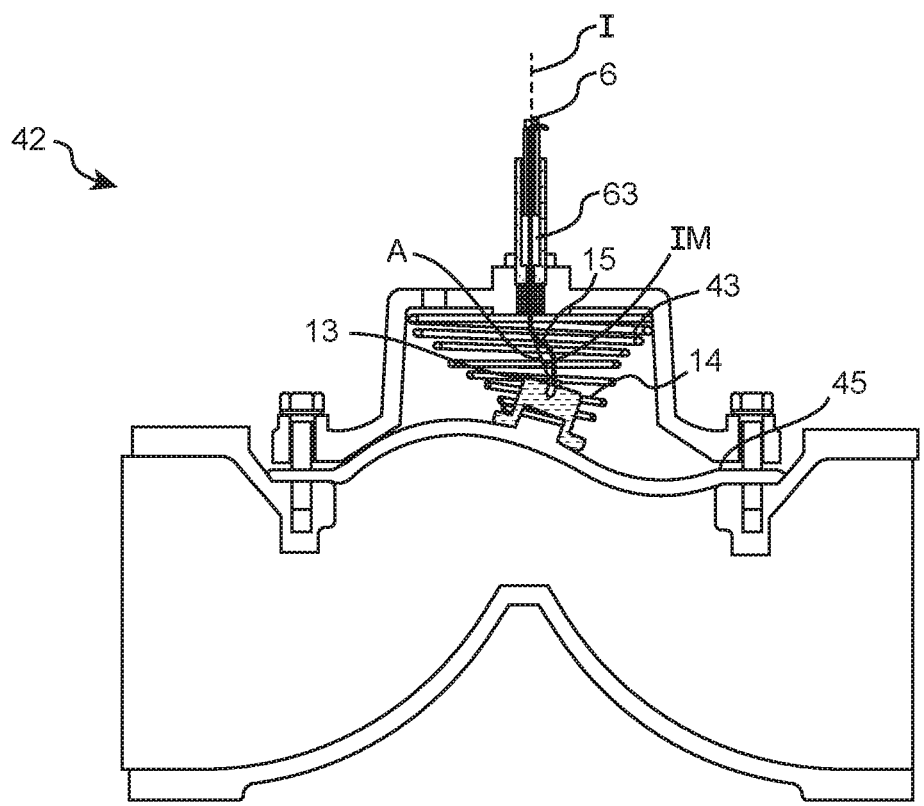
FIG. 2A is a front sectional view of another valve installed with the position indication assembly of FIG. 1A, with a diaphragm thereof in an intermediate position.

It should be appreciated that even if the wire 15 does reach its plastic region and is permanently deformed, it will be deformed sideways, as seen in FIG. 2A with respect to a valve 42. The valve 42 is operationally identical to the valve 2, yet comprises a thin diaphragm 45, and a biasing spring 43 biasing the support plate 14 and the diaphragm 45 downwardly, towards the flow blocking state of the diaphragm.

Figure 2B:
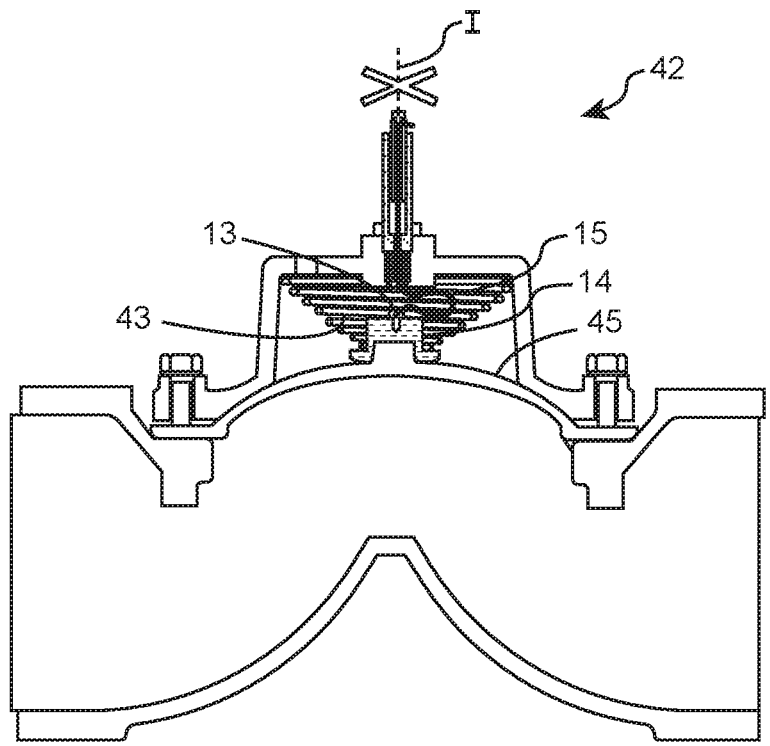
FIG. 2B is a front sectional view of the valve of FIG. 2A, with the diaphragm thereof in an upper position.

Once such plastic deformation sideways of the wire 15 occurs, compression forces applied by the diaphragm 45 on the second end 13 during standard operation, shall induce moment forces in the area of maximal deformation along the wire 15, i.e., area A. due to their nature, those moment forces can be potentially greater in impact than the normal desired/undesired forces applied by the diaphragm 5 on the second end 13, and can therefore induce further bending in the plastic region of the wire 15. In that case, the wire 15 will continue deforming as the diaphragm 5 moves up and down, as seen in FIG. 2B, without breaking and without interrupting the normal operation of the diaphragm 5, thus maintaining the valve 42 fully operational even when the position indication assembly 1 is not.

The wire 15 can have mechanical properties which, on the one hand facilitates large elastic region, so that the wire 15 will be able to withstand some bending reversibly, and on the other hand large plastic region, so that the wire 15 will be able to bend to a large extent without breaking.

The rod 6 is accommodated and configured to move linearly within an interior of an indicator housing 63, along an indicator axis I, not necessarily aligned with the longitudinal axis L of the wire 15.

Particularly, an imaginary straight line IM extending between the first and second ends 11,13, is movable due to movements of the second end 13 between an aligned position, seen in FIG. 1A, at which the imaginary line IM is aligned with the indicator axis I, corresponding to a straight orientation of the wire 15, and an angled position, seen in FIGS. 1B, and 2A, at which the imaginary line IM forms an angle with the indicator axis I corresponding to a tilted state of the diaphragm 5, or a bended state of the wire 15.

Figure 3A:
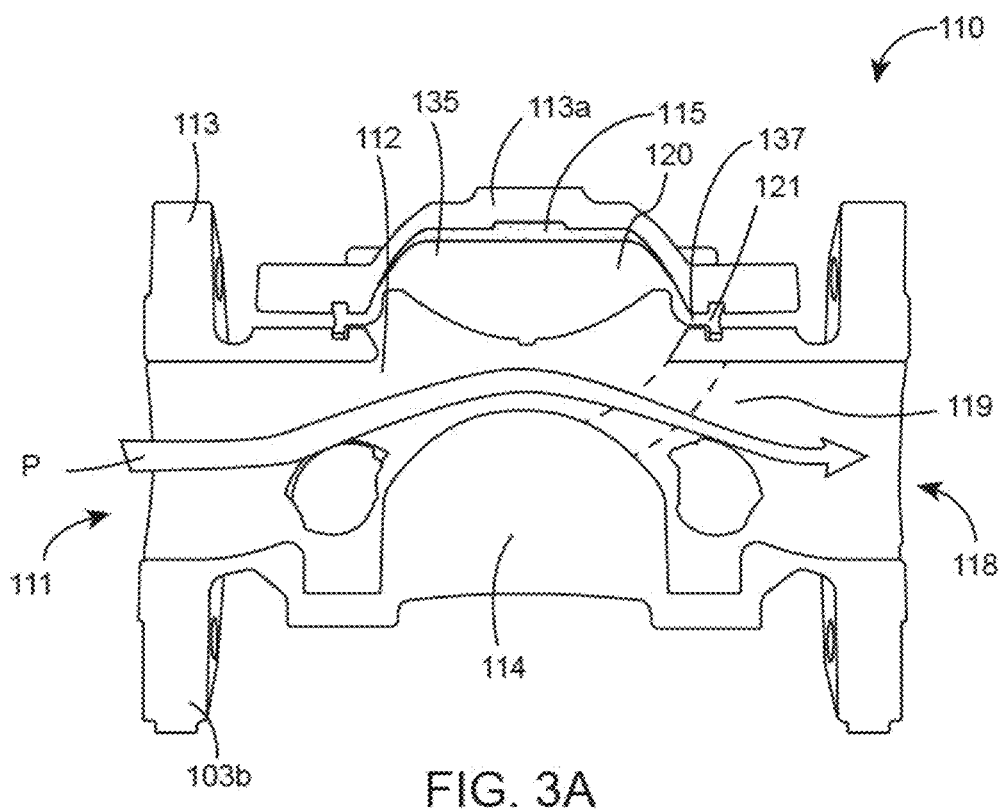
FIG. 3A is a front sectional view of yet another valve incorporated with a reinforced diaphragm according to one example of the presently disclosed subject matter, at an upper position.
Figure 3B:
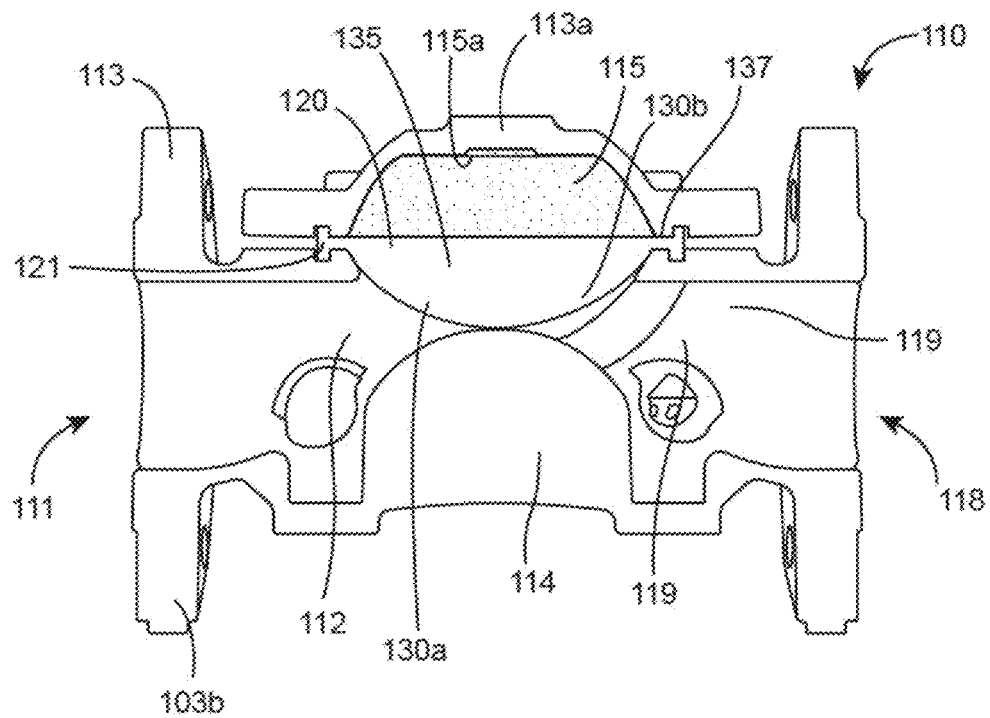
FIG. 3B is a front sectional view of the valve of FIG. 3A, with the reinforced diaphragm at a lower position.
Figure 4A:
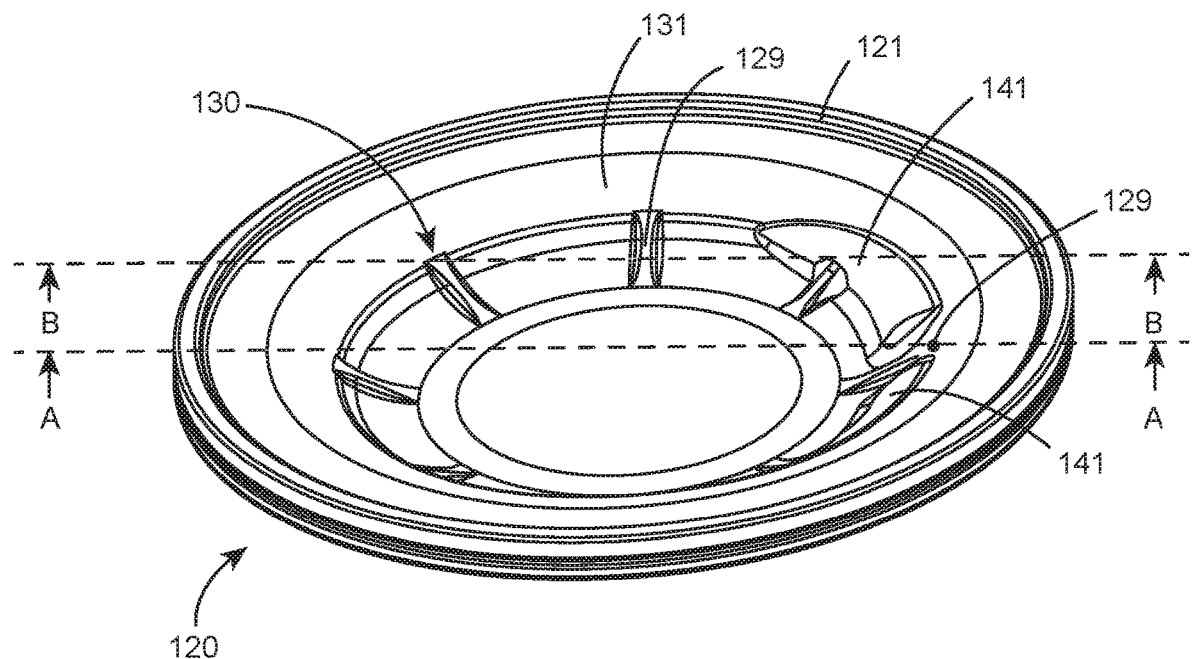
FIG. 4A is a top perspective view of the diaphragm used in the valve of FIG. 3A.
Figure 4B:
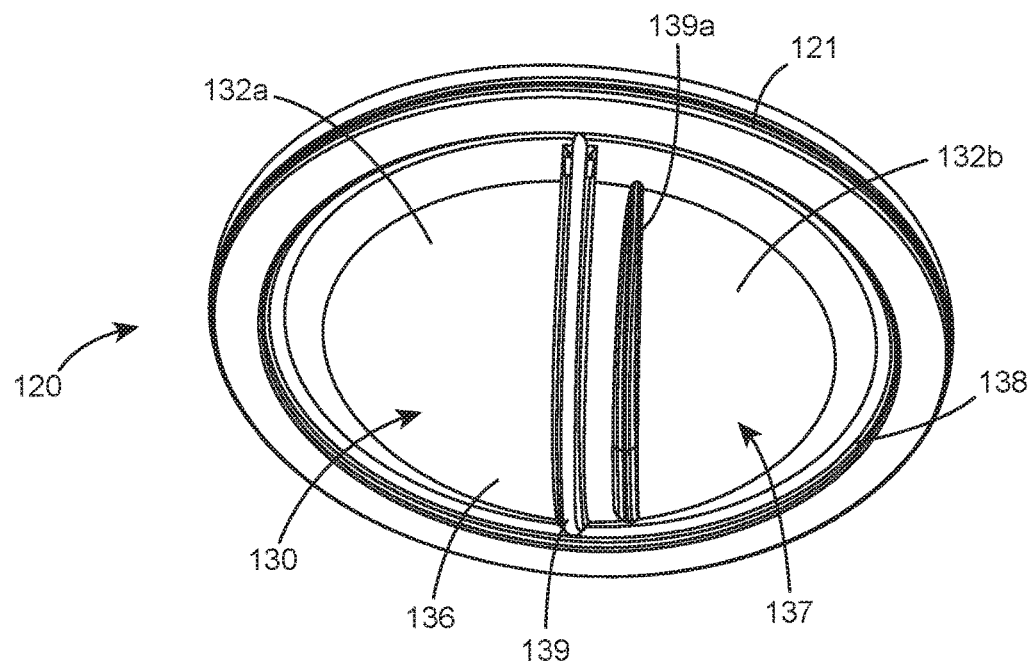
FIG. 4B is a bottom perspective view of the diaphragm of FIG. 4A.
Figure 4C:
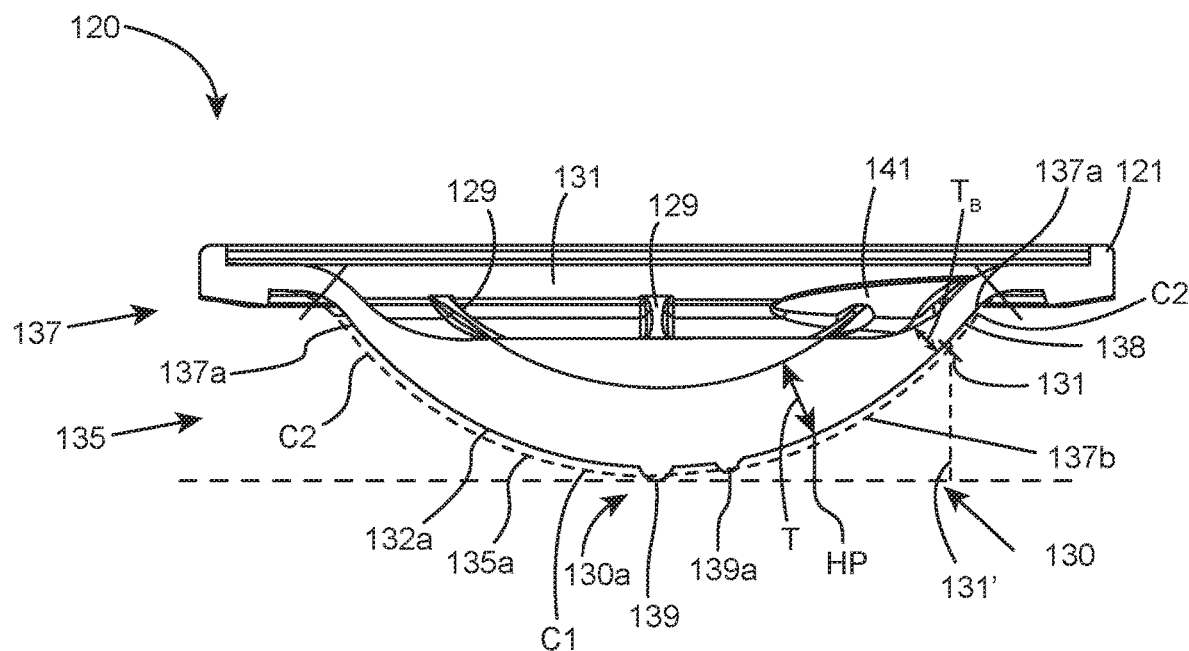
FIG. 4C is a cross sectional view of the diaphragm of FIG. 4A, taken along line A-A.
Figure 4D:
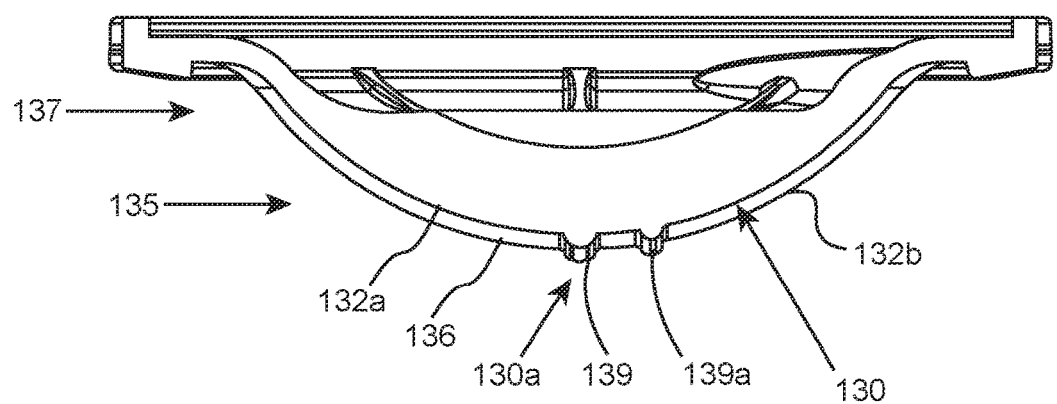
FIG. 4D is a cross sectional view of the diaphragm of FIG. 4A, taken along line B-B.

Attention is now directed towards FIGS. 3A and 3B illustrating another weir-type, pressure actuated valve 110, with a diaphragm 120 operatively disposed therein, separating between a main flow path P of the valve 110, and a control chamber 115 thereof. The diaphragm 120 is configured to change its state from a first, flow enabling state, at which it acquires an upper orientation thereby enabling the flow path P, i.e., an upper state, seen in FIG. 3A, and a second, flow blocking state, at which it acquires a lower orientation thereby blocking the flow path P, i.e., a lower state, seen in FIG. 3B.

The valve 110 has a valve body 113 including an inlet 111 extending into an inlet chamber 112, an outlet 118 extending from an outlet chamber 119, and a weir 114 formed therebetween protruding into the main flow path P, underneath a central portion of the diaphragm 120, with which the diaphragm is configured to sealingly engage, i.e., be compressed thereagainst, at the lower position thereof, to seal the flow path P.

As the valve 110 is a pressure actuated valve, the diaphragm 120 thereof is not held fixed in its position and orientation by any rigid fixing element, and has no driving means such as a stem configured to facilitate the up and down movement thereof. Instead, the diaphragm 120 is configured to move by means of pressure gradients and currents within the valve 110. Desirably, the diaphragm 120 should be configured to move merely up and down as a result of pressure gradients between the control chamber115 and the main flow path 118, however, in reality, the diaphragm 120 is also subject to perform other, undesired movements such as tilting, deforming, and drifting sideways.

At the lower state of the diaphragm, such drifting/deformation downstream can damage the sealing abilities of the diaphragm 120 against the weir 114, and when the valve 100 holds both upstream and downstream pressure, such drifting/deformation may even cause an undesired increase in downstream pressure, and thus possible leakage/failure to the pipeline on which the valve 110 is installed.

To resist such undesired movements, at least at the lower state thereof, the diaphragm 120 is a reinforced diaphragm configured to inherently resist at least drifting or deformation thereof towards downstream, by means of its structure and design.

The diaphragm 120, seen in greater detail in FIGS. 4A to 4D includes a circumferential portion 121 configured to be fixedly held by the valve body 113, as seen in FIGS. 3A and 3B, between a bonnet 113*a* and a lower portion of the valve body 103*b* including the weir 114.

The diaphragm 120 further includes a reinforced central portion 130 movable up and down with respect to the circumferential portion 121, at least when the latter is held by the valve body 113, between a first, lower position, seen in FIG. 3B, at which the central portion 130 is compressed against the weir 114 thereby blocking, and particularly sealing, the flow path P, and a second, upper position, seen in FIG. 3A, at which the central portion 130 is spaced to maximum from the weir 114, particularly such the it engages a ceiling 115*a* of the control chamber 115, thereby enabling the flow path P.

In other embodiments of the presently disclosed subject matter, the central portion 130 can be configured to move between two flow-enabling states, where in each of which the flow path P is enabled to a certain extent, one extent being greater than another.

The reinforced central portion 130 has a robust design when compared to typical diaphragms, allowing it to resist deformation and drift while experiencing a pressure gradient between two sides 130*a* and 130*b* thereof, exposed to the inlet and outlet chambers 112,119, respectively, as seem in FIG. 3B, or while experiencing any other disruption caused by pressure or flow of liquid in the valve 110, e.g., turbulence, water hammering, etc.

On the other hand, the reinforced central portion 130 has a rigidity allowing it to be compressed, i.e., flattened to a certain extent, against the weir 114 in a manner allowing it to acquire the shape of the upper surface of the weir 114, and thereby seal the flow path P.

The reinforced central portion 130 has a top face 131 facing away from the weir 114, being exposed to the control chamber 115, and an opposite bottom face 132 divided into an upstream face 132*a* facing the upstream chamber 112, and a downstream face 122*b* facing the downstream chamber 119, at least at a lower position of the central portion 130. The upstream face 132*a* and the downstream face 132*b* being separated by a sealing rib 139 configured to be compressed against the weir 114 to facilitate sealing between the two chambers 112, 119.

A further sealing rib 139*a* extending alongside the sealing rib 139, across the downstream face 132*b*, is configured to bear against the weir 114 to facilitate sealing in case of tilting of the central portion 130 downstream.

It should be appreciated that reinforced central portion 130 is configured to resist deformation and drifting, particularly while experiencing a pressure gradient between the upstream face 132*a* and the downstream face 132*b* thereof.

In general, the central portion 130 comprises a semi-rigid, lower, non-bendable region 135 with a first, low bendability, i.e., low ability to be easily bent without braking, configured to maintain its shape during movements of the central portion 130, in between the upper and lower positions, and maintain its shape while the central portion 130 is at the lower position while experiencing a pressure gradient between the faces 132a and 132b thereof, generated by said liquid.

The central portion 130 further comprises an upper, bendable region 137 with a second, high bendability, greater than said first bendability, connecting the non-bendable region 135 with the circumferential portion 121, configured to facilitate said up and down movements of the non-bendable region 135 by being flexible, and particularly bendable with respect to both the non-bendable region 135 and the circumferential portion 121. Herein, the bendable region 137 is configured to bend between a downward orientation, seen in FIG. 3A, at which it forms a downward facing obtuse angle with the non-bendable region 135, and an upward orientation, seen in FIG. 3B, at which it forms an acute angle with the non-bendable region [137] 135. The semi-rigid non-bendable region 135 is configured to maintain its shape and particularly its convex orientation, during movements of the diaphragm in between said positions.

The semi-rigid non-bendable region 135 has a substantially convex outer face 136, constituting a lowermost portion of the bottom face 132, while the bendable region 137 has a circular, strip-like, face 138 extending from the convex face 136 of the non-bendable region 135, and constituting an uppermost portion of the bottom face 132.

It should be appreciated that for a robust design as described, the convex face 136 should have a greater surface area than the circular face 138, such that a majority of the central portion 130 shall be non-bendable, thereby keeping the bendable portion small and thereby limiting the extent to which the diaphragm 120 can drift downstream, deform, or tilt. In particular, the convex face 136 should have a surface area of at least 50% of the bottom face 132, more particularly of at least 65%, and yet more particularly, of at least 80%.

Forming the non-bendable region 135 at, and above, an apex 130a of the central portion 130 configured to be compressed against the weir 114, contributes to friction between the central portion 130 and the weir 114, which also facilitates in preventing downstream drifting when the diaphragm is at a lower position seen in FIG. 3B.

The diaphragm 120 is made mostly of a resilient material, i.e., rubber. To render the non-bendable region 135 non-bendable, the diaphragm at that region has an average thickness between the top and bottom faces 131,132, which is greater than the average thickness of the bendable region 137, particularly at least two times the average thickness of the bendable region 137.

As the two regions 137, 135 are made continuously of the same material, it should be appreciated that the thickening of the diaphragm from the bendable region 137 to the non-bendable region 135 occurs gradually.

To describe that gradual increase, a longitudinal axis LP for the diaphragm can be defined (seen in FIG. 4C), extending tangent to the apex 130a of the lower convex face 136, in a direction from the upstream face 132a to the downstream face 132b.

As can be seen in the figure, at the cross section of the diaphragm taken along that longitudinal axis LP, a contour 135a of the lower non-bendable region, i.e., of the convex face thereof, is greater than a contour 137a of the upper bendable region, i.e., of the circular face 138 thereof. Namely, a nominal length C1 of the contour of the upper bendable region (even without considering the ribs 129), is greater than a nominal length C2 of the contour of the upper bendable portion.

It should also be appreciated that at the cross section of the diaphragm taken perpendicularly to the longitudinal axis LP, at an area of the apex thereof, a contour 135a of the lower non-bendable region, i.e., of the convex face 136 thereof, is greater than a contour 137a of the upper bendable region, i.e., of the circular face 138 thereof. Namely, a nominal length C1 of the contour of the upper bendable region (even without considering the ribs 129), is greater than a nominal length C2 of the contour of the upper bendable portion.

The average thickness of the non-bendable region, between the top and bottom faces 131,132, along the axis LP, is greater than the average thickness of the bendable region 137, particularly at least two times greater.

It should be appreciated that at a half way point HP along the axis LP, between the apex 130a and a projection 131' of a border 131 between the convex face 136 and the circular face 138 on the longitudinal axis LP, the diaphragm 120 has a thickness T between the top and bottom faces of at least two times that thickness TB at the border 131.

According to some examples of the presently disclosed subject matter, the bendable region 137 can even have a thickness, between the top and bottom faces 131,132, smaller than that thickness of the non-bendable region, throughout the longitudinal axis LP.

In fact, a majority of the bendable region 137 has the same thickness between the top and bottom faces 131,132, while that thickness of the non-bendable region 135 varies.

The bendability of the diaphragm 120 at any given location thereon depend directly on its thickness at that location. With such correspondence between thickness and bendability, it should be appreciated that everything mentioned herein with respect to the thickness of the diaphragm, and particularly its distribution, also applies on the bendability thereof, and its distribution.

The diaphragm 120 further comprises a circular array of support ribs 129 protruding from the top face 131. The support ribs 129 are configured to bias the central portion 130 to its lower position, seen in FIG. 3B. The ribs 129 are formed on top of the bendable region 137, and are configured to maintain the top face 131 at the bendable region 137 at a desired angle with respect to the top face 131 at the non-bendable region 135, particularly herein an obtuse angle greater than 90 degrees.

As explained hereinabove, deformation of the diaphragm downstream can cause true damage to a pipeline if the downstream chamber holds pressure. To further prevent such, the diaphragm 120 is formed asymmetrically, with the downstream portion 130b of its central portion having more volume than the upstream portion thereof 130a. The extra volume adds extra reinforcement at the downstream portion 130b, which in turn reduces the possibility of downstream deformation of the diaphragm at that side.

To maximize resistant to deformation, the extra volume is added to the most malleable zone of the downstream portion 130b, i.e., to the bendable region 137 associated therewith.

In particular, the extra volume is added in the form of two reinforcing bulges 141 protruding from the top face 131, i.e., from an area of the bendable region 137 extending above the downstream face 132b.

Such bulges 141 can hold back the non-bendable region 135 from drifting downstream underneath the bendable region 137, and can prevent the diaphragm 120 from deforming downstream, e.g., due to pressure gradient between the control chamber 115 and the downstream chamber 119.

The diaphragm 120 is also configured for use with valves having a support element, such as support element 115, extending from a weir thereof across their outlet chamber, typically from a center of the weir.

In such case, the diaphragm 110 should be positioned such that the support element 115 extends along its longitudinal axis LP, with a support portion 140 of the diaphragm 120 engaging the support element 115, and the two bulges 141 being disposed on either side thereof.

In the present example, the support portion 140 comprises one of said sealing ribs 129, also extending along the longitudinal axis LP. It should be appreciated that even with a sealing rib 129, the support portion 140 has a smaller thickness between the top and bottom faces 131,132 than that thickness of its adjacent portions, i.e., the portions of the diaphragm 120 including the bulges 141.

In order to maintain the movement facilitation capabilities of the bendable region 137, the bulges 141 can be limited to the downstream portion 130b of the central portion 130 only, and each of the bulges 141 can have a shape gradually increasing in volume towards the axis LP, rendering it a tear-drop-like form along the circular bendable region 137.

Figure 5A:
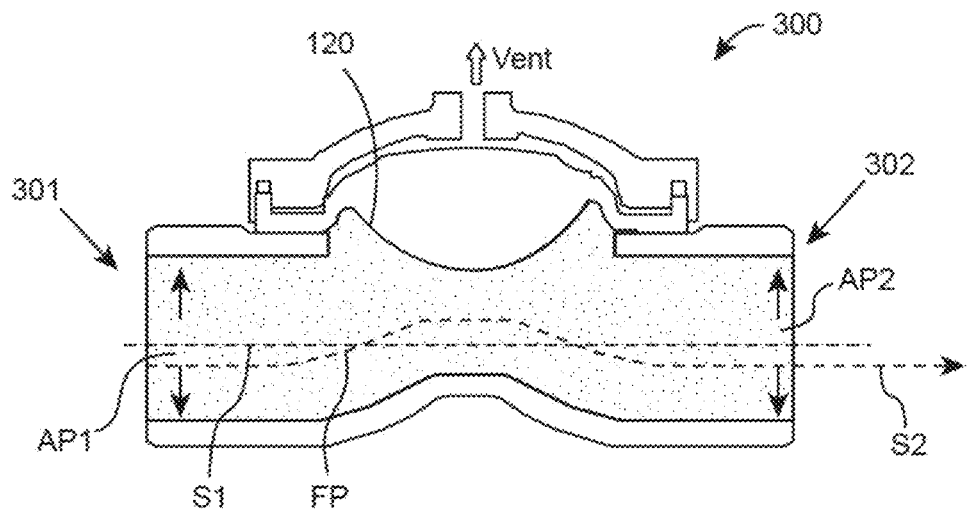
FIG. 5A is a is a schematic sectional view of a valve having a weir lower than a central streamline thereof, with the diaphragm of FIG. 4A at an upper position.
Figure 5B:
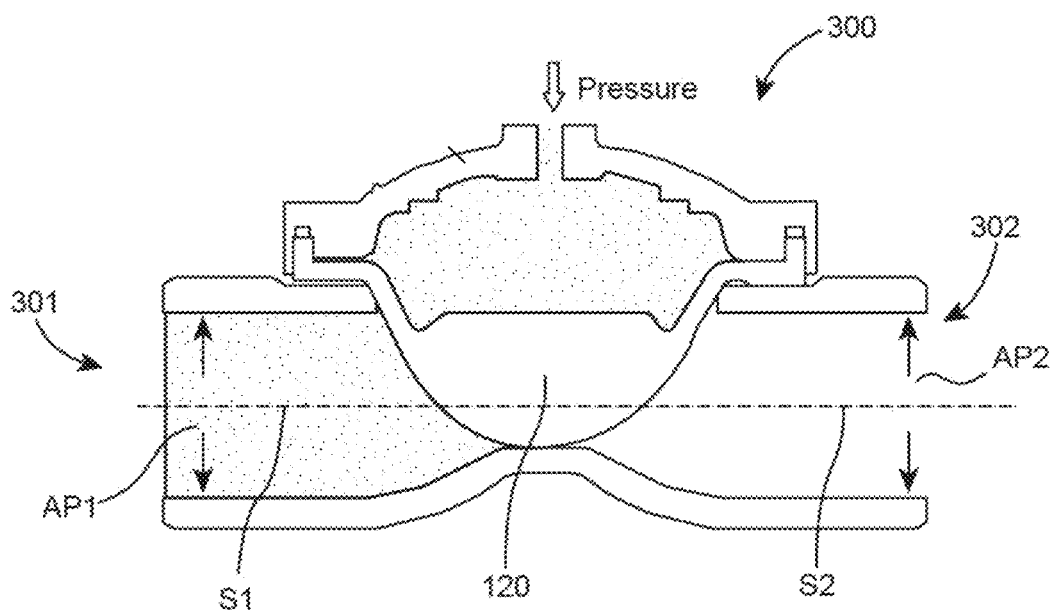
FIG. 5B illustrates the valve of FIG. 5A, with the diaphragm at a lower position.

It should be appreciated that the diaphragm 120 is advantageous when used in weir type valves, such as the valve 110, yet that the diaphragm 120 is even more advantageous when used in weir type valves having a lowered weir, such as the valve 300 seen in FIGS. 5A and 5B.

The valve 300 comprises an inlet 301 having an aperture AP1 defining a central streamline S1 at its center, and an outlet 302 having an aperture AP2 defining a central streamline S2 at its center.

Those two streamlines S1 and S2 are cojoined above a weir 304 of the valve 300, such that they intersect with the diaphragm 120, and particularly the central portion 130 thereof, when the latter is at its lower position. Being central streamlines passing furthest from any wall of the inlet 301 or outlet 302, those streamlines S1,S2 are configured to accommodate fluid flowing with the most energy.

As in typical valves, e.g., the valve 110 and the valve 1, the weir is disposed above the central stream lines to be able to resist the energy of flow therein, in the valve 300, the diaphragm 120, and particularly the reinforcing central portion 130 thereof, is capable of handling that energy, due to its robust design. Therefore the robust design of the diaphragm allows lowering of the weir 304 beneath at least the streamline S1, thereby facilitating smoother flow between the inlet 301 and the outlet 302, with less head losses.

For further reinforcements, the diaphragm can further include a sheet of fabricated material, placed between the two layers of elastic material.

To facilitate a less-malleable lower portion of the central portion 130, i.e., the portion thereof more likely to intersect the central streamlines S1,S2 at a lower position, the thickness of the diaphragm beneath the fabricated sheet, can be greater than the thickness of the diaphragm above the fabricated sheet.

The invention claimed is:

1. A weir type hydraulic pressure actuated valve, comprising:
   an inlet having an aperture defining an inlet central streamline axis extending therealong;
   an outlet having an aperture defining an outlet central streamline axis extending therealong, said outlet defining together with said inlet a main flow path for liquid to flow in through the weir type hydraulic pressure actuated valve;
   a weir disposed between the inlet and outlet, such that said inlet central streamline axis and said outlet central streamline axis are met thereabove; and
   a diaphragm disposed above said weir, said diaphragm comprising:
   a circumferential portion fixedly held by a valve body of the weir type hydraulic pressure actuated valve; and
   a reinforced central portion movable with respect to said circumferential portion, by hydraulic pressure applied by said liquid, between a lower position at which said reinforced central portion is compressed against said weir, thereby sealing said main flow path, and an upper position at which said reinforced central portion is spaced from said weir, thereby enabling said main flow path, said reinforced central portion having a top face configured to face away from said weir, and an opposite bottom face divided into an upstream face configured to face said inlet and a downstream face configured to face said outlet;
   said reinforced central portion having a lower region with a convex face constituting a lowermost portion of said bottom face, said lower region having a first bendability allowing said lower region to maintain its shape at least during movement of the reinforced central portion at least in between said lower and upper positions, and an upper region with a circular face constituting an uppermost portion of said bottom face, said upper region having a second bendability greater than said first bendability allowing said upper region to facilitate said movement
   wherein said reinforced central portion comprises an upstream portion associated with said upstream face, and having a first volume, and an opposite downstream portion associated with said downstream face, having a second volume greater than said first volume.

2. The weir type hydraulic pressure actuated valve according to claim 1, wherein said inlet central streamline axis and said outlet central streamline axis coincide above said weir.

3. The weir type hydraulic pressure actuated valve according to claim 1, wherein said lower region has an average thickness, between the top and bottom faces, of at least two times that thickness of said upper region.

4. The weir type hydraulic pressure actuated valve according to claim 1, wherein said diaphragm has an axis extending tangent to an apex of said lower convex face, in a direction from said upstream face to said downstream face; and wherein at a half way point along said axis, between said apex and a projection of a border between the convex face and the circular face on said axis, said diaphragm has a thickness between said top and bottom faces of at least two times a thickness between said top and bottom faces at said border, at least for a portion of the diaphragm associated with said upstream face.

5. A diaphragm actuated by hydraulic pressure, for use with a weir type valve having a valve body including an inlet extending into an upstream chamber, an outlet extending from a downstream chamber defining together with the inlet a main flow path for liquid to flow in through the weir type valve, and a weir disposed therebetween, said diaphragm comprising:
   a circumferential portion configured to be fixedly held by said valve body;
   a reinforced central portion having a top face configured to face away from said weir, and an opposite bottom face divided into an upstream face configured to face said upstream chamber, and a downstream face configured to face said downstream chamber, said reinforced central portion being movable with respect to said circumferential portion, by hydraulic pressure applied by said liquid, between a lower position at which said reinforced central portion is configured to be compressed against said weir, thereby sealing said main flow path, to an upper position at which said reinforced central portion is configured to be spaced from said weir, thereby enabling said main flow path;

said reinforced central portion having a lower region with a first bendability, allowing said upper region to maintain its shape at least during movement of the reinforced central portion at least in between said lower and upper positions, and an upper region with a second bendability greater than said first bendability allowing said upper region to facilitate said movement; wherein said lower region has a concave face, constituting a lowermost portion of said bottom face, and said upper region has a circular face constituting an uppermost portion of said bottom face, and wherein said reinforced central portion has an axis extending tangent to an apex of the convex face, in a direction from the upstream face to the downstream face, and wherein at a cross section of the diaphragm taken along said axis, a contour of said convex face is greater than a contour of said circular face, wherein said reinforced central portion comprises an upstream portion associated with said upstream face, and having a first volume, and an opposite downstream portion associated with said downstream face, having a second volume greater than said first volume.

* * * * *